(12) United States Patent
Ono

(10) Patent No.: US 7,505,622 B2
(45) Date of Patent: Mar. 17, 2009

(54) COLOR INFORMATION ACQUISITION APPARATUS, COLOR INFORMATION ACQUISITION METHOD, AND COLOR INFORMATION ACQUISITION PROGRAM PRODUCT

(75) Inventor: Satoru Ono, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 461 days.

(21) Appl. No.: 11/134,626

(22) Filed: May 23, 2005

(65) Prior Publication Data

US 2005/0265597 A1    Dec. 1, 2005

(30) Foreign Application Priority Data

May 25, 2004    (JP) .............................. 2004-154798

(51) Int. Cl.
*G06K 9/00* (2006.01)
(52) U.S. Cl. .................. 382/162; 382/165; 358/1.9; 358/504; 358/521; 358/518
(58) Field of Classification Search .......... 382/162, 382/165; 358/1.9, 504, 421, 518
See application file for complete search history.

(56) References Cited

U.S. PATENT DOCUMENTS

| | | | | |
|---|---|---|---|---|
| 5,157,506 | A * | 10/1992 | Hannah | 382/167 |
| 6,538,770 | B1 * | 3/2003 | Mestha | 358/1.9 |
| 7,069,164 | B2 * | 6/2006 | Viturro et al. | 702/85 |
| 7,081,976 | B2 * | 7/2006 | Harrington | 358/504 |
| 7,085,004 | B2 | 8/2006 | Sharma et al. | |
| 7,095,531 | B2 * | 8/2006 | Mizes et al. | 358/1.9 |
| 7,161,719 | B2 * | 1/2007 | Wu et al. | 358/518 |
| 7,307,752 | B1 * | 12/2007 | Mestha et al. | 358/1.9 |
| 2002/0063907 | A1 * | 5/2002 | Harrington | 358/504 |
| 2003/0011798 | A1 * | 1/2003 | Yamamoto et al. | 358/1.9 |
| 2003/0058459 | A1 * | 3/2003 | Wu et al. | 358/1.9 |
| 2003/0160980 | A1 * | 8/2003 | Olsson et al. | 358/1.9 |
| 2003/0202197 | A1 * | 10/2003 | Saito et al. | 358/1.9 |
| 2004/0004731 | A1 * | 1/2004 | Itagaki | 358/1.9 |
| 2004/0051887 | A1 * | 3/2004 | Nishide et al. | 358/1.9 |
| 2004/0136013 | A1 * | 7/2004 | Mestha et al. | 358/1.9 |
| 2004/0136016 | A1 * | 7/2004 | Oshikawa et al. | 358/1.9 |
| 2005/0146737 | A1 * | 7/2005 | Ono | 358/1.9 |
| 2005/0169651 | A1 * | 8/2005 | Yamada | 399/49 |

FOREIGN PATENT DOCUMENTS

| | | |
|---|---|---|
| JP | 2000-278543 A | 10/2000 |
| JP | 2001320592 | 11/2001 |
| JP | 2002279436 | 9/2002 |

* cited by examiner

*Primary Examiner*—Mark K Zimmerman
*Assistant Examiner*—Elbert Tsang
(74) *Attorney, Agent, or Firm*—Sughrue Mion, PLLC

(57) ABSTRACT

Conventionally, acquisition of color values from a color chart takes substantial labor and time. According to this invention, when the color value of each patch composing a predetermined line is input with each line of the color chart composed of a plurality of patches as the measurement unit, a measured line identification processor determines whether or not said line to be measured was measured in the predetermined measurement order, a warning section performs a predetermined warning processing if the measurement order for said line to be measured is no to correct, and when a color value acquisition line correction instruction is input to correct a line whose color value is expected to be acquired in said measurement order, a color value saving section makes the color value of said input each patch correspond to the gradation value of each patch composing said line to be measured.

11 Claims, 9 Drawing Sheets

FIG.5

| Patch position | L* | a* | b* | D_C | D_M | D_Y | D_K |
|---|---|---|---|---|---|---|---|
| 0 | 88.578 | 4.886 | -3.468 | 0 | 0.1 | 0 | 0 |
| 1 | 87.116 | 7.459 | -4.109 | 0 | 0.2 | 0 | 0 |
| 2 | 85.404 | 10.157 | -4.834 | 0 | 0.3 | 0 | 0 |
| 3 | 83.912 | 12.763 | -5.56 | 0 | 0.4 | 0 | 0 |
| 4 | 80.474 | 18.044 | -6.797 | 0 | 0.5 | 0 | 0 |
| 5 | 77.494 | 23.28 | -7.908 | 0 | 0.6 | 0 | 0 |
| 6 | 91.263 | 0.11 | -1.847 | 0 | 0 | 0 | 0 |
| 7 | 74.28 | 28.409 | -8.731 | 0 | 0.7 | 0 | 0 |
| 8 | 71.524 | 32.529 | -9.202 | 0 | 0.8 | 0 | 0 |
| 9 | 67.012 | 40.488 | -10.2 | 0 | 0.9 | 0 | 0 |
| 10 | 62.485 | 47.557 | -10.525 | 0 | 1.0 | 0 | 0 |
| 11 | 58.893 | 53.501 | -10.771 | 0 | 1.0 | 0 | 0 |
| 12 | 57.115 | 56.924 | -10.721 | 0 | 1.21 | 0 | 0 |
| 13 | 54.424 | 61.013 | -10.18 | 0 | 1.3 | 0 | 0 |
| 14 | 52.441 | 63.977 | -9.602 | 0 | 1.4 | 0 | 0 |
| 15 | 50.132 | 66.795 | -8.317 | 0 | 1.5 | 0 | 0 |

FIG. 9

| Particular information patch | Patch position in measured line | Patch position in line number m | Second characteristic value element q |
|---|---|---|---|
| Particular information patch 1 | n1 | n1_m | if n1=n1_m then q=1/j else q=0 |
| Particular information patch 2 | n2 | n2_m | if n2=n2_m then q=1/j else q=0 |
| — | — | — | — |
| Particular information patch j | nj | nj_m | if nj=nj_m then q=1/j else q=0 |

COLOR INFORMATION ACQUISITION APPARATUS, COLOR INFORMATION ACQUISITION METHOD, AND COLOR INFORMATION ACQUISITION PROGRAM PRODUCT

BACKGROUND OF THE INVENTION

Field of the Invention

This invention relates to a color information acquisition apparatus, color information acquisition method, and color information acquisition program product, and specifically to a color information acquisition apparatus, color information acquisition method, and color information acquisition program product, wherein a predetermined color chart is measured to acquire color information.

As a well known prior art, there is a gradation characteristics data generation system wherein a plurality of patches corresponding to input levels are printed, and when the shading of each patch is measured, if there is a difference substantially larger than a predetermined criterion between the actual output level obtained from the measurement of each patch and the predicted output level, a warning is issued (refer to Japanese Patent Laid-Open No. 2000-278543, hereinafter called Patent Document 1, for example).

In the art disclosed in the above Patent Document, only a warning is issued that indicates there is a predetermined difference between actual output level and predicted output level. Therefore, even if a patch was accurately measured, when the order of patch measurement was not correct, the warning is issued and the operator will stop or retry the measurement at that point. That is, in the prior art, the measurement once made may become useless and also the same patch has to be measured more than once, thereby requiring more labor and time to acquire the actual output level of a patch.

SUMMARY OF THE INVENTION

This invention has been made in view of the above problems, and therefore an object of this invention is to provide a color information acquisition apparatus, a color information acquisition method, and a color information acquisition program product which utilize measurement result effectively to obtain the color measurement value for each patch efficiently and accurately.

To achieve the above object, the color information acquisition apparatus according to this invention acquires the color value of each patch by measuring a color chart composed of a plurality of patches.

Here, a measured line identification processor determines whether the lines to be measured have been measured in the order predetermined for each line, when the color value of each line of the predetermined line is input with each line of the color chart as the unit of color measurement. If the measurement order of the lines to be measured is not correct and the lines are measured in the different order from the predetermined order, a warning section performs a predetermined warning processing.

Thanks to the warning processing, the operator measuring the color chart recognizes that he or she measured a different line from the line. The operator, then, is able to issue an instruction to correct the color value acquisition line from which color values are to be acquired in the predetermined order. When the color value acquisition line correction instruction is input, a color value saving section saves, according to the instruction, the input color value of each patch by making the input color correspond to the gradation value of each patch of the line to be actually measured, instead of the line from which color value is expected to be acquired in the predetermined order.

That is, according to this invention, even if the operator erroneously measured a different line from the line to be measured, the color values obtained by measuring each line will not become useless and are saved as the measured values of the patches of the line to be measured. As a result, even if the operator measured lines in the wrong order, the operator need not to measure more than the number of lines composing the color chart, and consequently all the patches can be measured very efficiently.

If the lines to be measured were measured in the correct order, the values of the patches are saved by making them correspond to the patches composing the line from which the color values are expected to be acquired in the predetermined measurement order.

As another embodiment of this invention, the color measured line identification processor may determine which line of the color chart has been measured, based on the predetermined color values of the patches composing the line to be measured. Then, the measured line identification processor determines whether the identified line matches the line expected to be measured in the predetermined order, and if they do not match the warning processing is performed.

The measured line identification processor may be made to acquires the position of a particular patch contained in the measured line based on the input color values, as a concrete example of the character value described above, and identify the measured line by referring to the correspondence between the acquired characteristic value and each line and its characteristic value stored in the predetermined storage area.

Since the position of the particular patch can be located easily based on its color value, the characteristic value to be acquired from the same line always becomes the same value. Therefore, it is possible to accurately identify which line of the color chart is the line to be measured.

The result of the measurement of the color chart is often used for a calibration to correct the color differences in a printing device. In this case, typically, the correspondence between the gradation value and color value of color image data has been acquired in advance, as reference data to be used for the correction described above. Therefore, as still another embodiment of this invention, the measured line may be identified using such reference data.

Specifically, the measured line identification processor determines the relevance factor of the measured line and each line, which is composed of the result of comparing between lines the characteristic value, the color value of each patch of the measured line, and the reference color value of each patch of the color chart stored in the predetermined storage area. Then, the measured line identification processor identifies the line with highest relevance factor as the measured line, based on the relevance factor.

As the comparison result described above, the average value of color differences of patches between the measured line and the compared line is conceivable. Also in this case, the relevance factor is composed of the characteristic value as well as the comparison result. As a result, it is possible to prevent a different line from being identified as the measured line in such a case where there is substantial color differences in the color chart.

As another embodiment of this invention, the measured line identification processor may be made to acquire the characteristic value by identifying both or either one of the positions of a patch with highest brightness and one with lowest brightness. Since typical values can be obtained as measurement values from a patch with highest brightness and/or one with lowest brightness, the positions of such patches can be easily identified. Also, other various patches may be used, such as a patch whose color saturation records the highest or lowest value, or a patch whose predetermined element color records the highest or lowest density.

As a still another embodiment of this invention, the warning section may be made to cause an image display device to display the line to be measured and the line expected to be measured in the predetermined order. This display allows the operator to accurately recognize the line measured by him or her, thereby preventing a re-measurement of the measured line. It is also possible to clearly recognize the line that is expected to be measured but not yet measured. As a result, the color values of all the patches can be obtained with a minimum labor, when measuring the color chart by the line.

The color information acquisition apparatus according to this invention may include: a device that stores, when there are a plurality of patch groups composing the color measurement unit which is made up of a plurality of patches, the individual patch groups and the data indicating the characteristics of the individual patch groups, by making the patch groups and the data correspond to each other; a device that calculates the data indicating the characteristic of the patch group based on a particular information patch contained in the predetermined measured patch group; and a unit to make the calculated data correspond to the data indicating the characteristics of the individual patch groups stored in the storage unit. In this case, the particular information patch is identified based on the measurement result of the predetermined patch group. Specifically, if the data indicating the individual patch groups and the data indicating their characteristics beforehand by making the both data correspond to each other, then the measured predetermined patch group can be easily identified.

So far, the technical concept of this invention has been described as the invention of an apparatus. However, the technical concept holds true also for the invention of a procedure. Also, when implementing this invention, it is possible to cause a computer to execute a predetermined program to acquire the color value of each patch. This invention can be implemented as such a program product, which has basically the same function as the color information acquisition apparatuses described above.

Needless to say, it is possible to adapt various modifications and embodiments to the method and program product described above. Furthermore, any storage medium can be used to provide the program product. The storage media may include magnetic recording media, magnetic optical recording media, and even recording media expected to be developed in the future. Moreover, if this invention is implemented partly by software and partly by hardware, the concept of this invention remains almost the same. Such an implementation includes an embodiment wherein part of the data resides on recording media and is read in as needed. Also, regarding the copying stage, it goes without saying that primary copies and secondary copies are equivalent.

BRIEF DESCRIPTION OF THE DRAWINGS

FIG. 5 is a schematic diagram showing an example of color values for measured lines;

FIG. 9 is a schematic diagram for a second characteristic value calculation process.

DESCRIPTION OF THE PREFERRED EMBODIMENTS

The preferred embodiments of this invention will be described in the following order:
(1) Basic configuration of an embodiment
(2) From printing of a color chart through calibration
(3) Other embodiments
(4) Conclusion
(1) Basic Configuration of an Embodiment This section describes an embodiment in which the color chart measurement and color value acquisition process of this invention is performed as part of the so-called calibration process.

Figure 1:
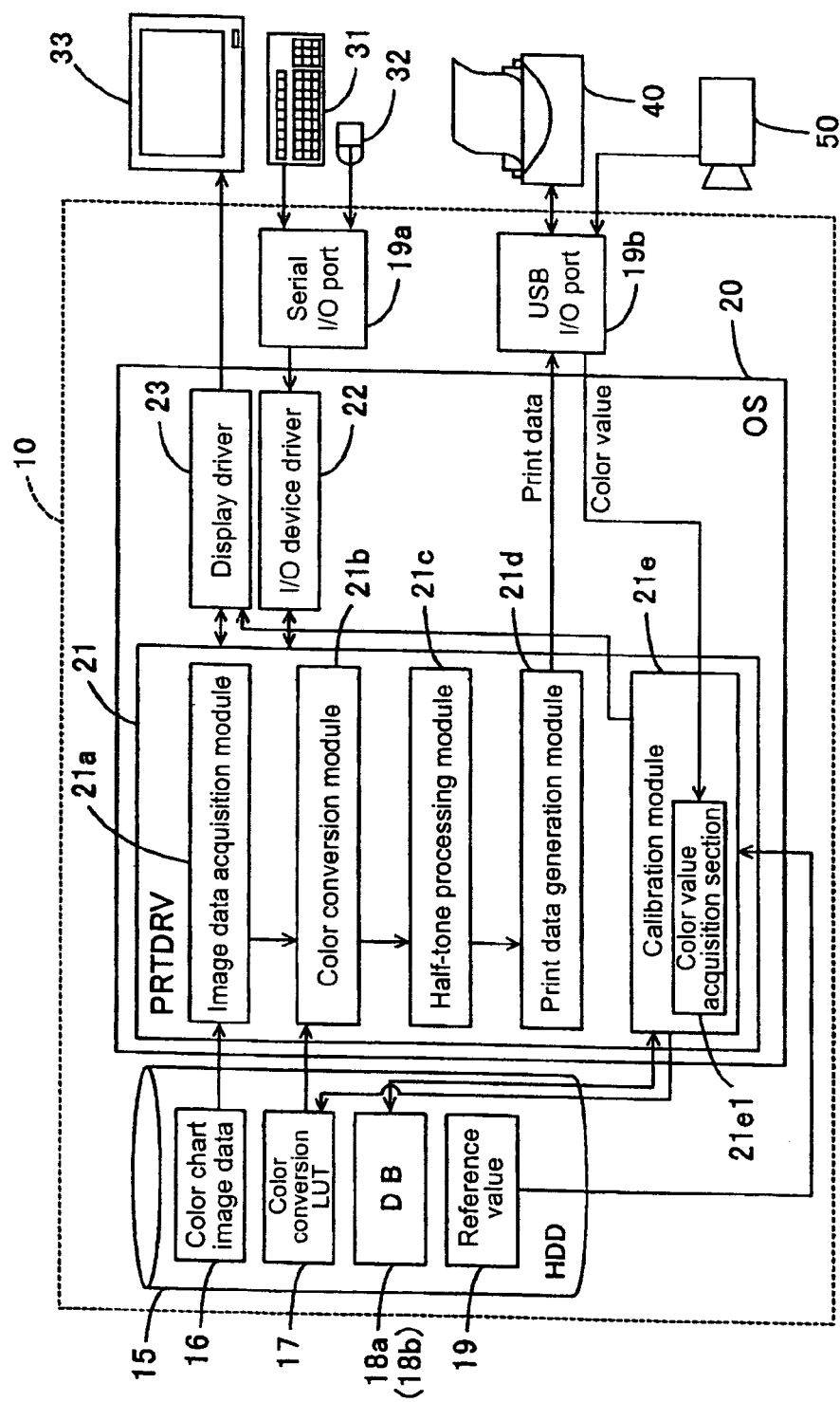
FIG. 1 is a simplified block diagram showing an embodiment of this invention.

FIG. 1 shows a basic configuration of the hardware and software of this embodiment. The software configured as shown is saved in a predetermined storage medium and such software itself composes a program product.

A computer 10 includes a CPU which is central to arithmetic processing and storage media composed of ROM, RAM, etc. (the CPU and the storage media are not shown), and executes predetermined programs (program codes) using peripheral devices such as an HDD 15. To the CPU 10, input devices such as a keyboard 31 and a mouse 32 are connected via a serial I/O port 19a, a display 33 is connected through a video board (not shown), and a printer 40 is connected via a USB I/O port 19b.

The printer 40 includes a mechanism capable of separately mounting and demounting a plurality of ink cartridges each of which is filled with different colored ink (recording agent). Cartridges separately containing cyan, magenta, yellow, and black (CMYK) inks are mounted on this mechanism. The printer 40 can produce numerous colors by combining these primary colors, and thereby form a color image on a printing medium. The printer 40 of this embodiment is an ink-jet printer, but this invention may also be applicable to other printers including a laser printer.

Moreover, it is not essential to use this four-color combination of CMYK, but various color combinations can be employed, such as six colors of CMYKLcLm (CMYK+light cyan and light magenta) or seven colors of CMYKLcLmDY (CMYKLCLM+dark yellow).

The computer 10 inputs predetermined color values from a color measuring device 50 via the USB I/O port 19b. The color measuring device 50 can illuminate a printed material with a light source whose spectral reflection factor is known, and detects the reflected light to determine the spectral reflection factor of the printed material, and thereby output its color values, for example, L*a*b, L*C*h, and XYZ values as well as respective density of CMYK.

The computer 10 has a printer driver (PRTDRV) 21, an input device driver (DRV) 22, and a display driver (DRV) 23, all embedded in an OS 20. The display driver DRV 23 is a driver to control the displaying, on a display 33, of images to be printed, the property window for a printer, and the like. The I/O device driver DRV 22 is a driver to receive a code signal input from the keyboard 31 or the mouse 32 via the serial I/O port 19*a*, and to allow a predetermined input operation.

The PRTDRV 21 executes a predetermined processing for a image or a predetermined color chart image which is instructed to be printed by an application program (not shown), thereby enabling the printing of the same. For this purpose, the PRTDRV 21 includes an image data acquisition module 21*a*, a color conversion module 21*b*, a half-tone processing module 21*c*, and a print data generation module 21*d*.

When the above-mentioned print instruction is issued, the PRTDRV 21 is activated and sends data to the display driver DRV 23 to display, on the display 33, a user interface (UI) screen (not shown) through which information indicating predetermined print conditions, or instructions to perform a calibration are input.

When the user inputs, through the UI, the required information by operating the keyboard 31, mouse 32, etc. and issues a command to print, the modules of the PRTDRV 21 are activated to perform their respective processing on predetermined image data for generating print data.

Specifically, the image data acquisition module 21*a* obtains from the HDD 15 the predetermined image data and color chart image data 16, described below, for the image to be printed. At this time, the obtained image data undergoes a predetermined resolution conversion if necessary. The image data is dot matrix data that represents each component color of RGB by multi-gradations to specify the color of each pixel, and thus employs a color system conforming to the sRGB standard. Needless to say, other image data such as JPEG image data employing the YCbCr color system or image data employing the CMYK color system can also be used.

The color conversion module 21*b* is a module for conversion of the color system which represents the color of each pixel. This module converts the sRGB color system of image data into the CMYK color system composed of colored inks used by the printer 40, by referring to a color conversion LUT 17 recorded in the HDD 15. The color conversion LUT 17 is a table in which a color is represented by both sRGB and CMYK color systems and also the correspondence between these color systems is described for a plurality of colors. Therefore, it is possible to convert any color represented by the sRGB color system into a color of the CMYK color system, by referring to sRGB colors that are in the neighborhood of the original color and are specified in the color conversion LUT 17, and calculating the corresponding CMYK color.

When CMYK data is obtained through the conversion by the color conversion module 21*b*, the half-tone processing module 21*c* converts the gradation value of each pixel represented by the CMYK color system into half-tone image data in which whether or not to discharge the ink is specified for each pixel, i.e., whether or not to discharge the ink is determined for each pixel of the printer 40. In addition to the control of whether or not to discharge the ink, it is also possible to allow gradual control of the amount of discharging ink, and thereby to decide the size of a drop of ink.

The print data generation module 21*d* receives the half-tone image data, rearrange them in the order of being used in the printer 40, and then generates print data in units of data to be used for one main scan. The print data is output to a serial printer 40 via a parallel I/O port 19*b*. When all the data needed to form an image are transferred to the printer 40, the printer 40 forms the image on a printing medium.

The PRTDRV 21 further includes a calibration module 21*e*, which acquires color values from a color chart 50 and corrects the color conversion LUT 17 based on the acquired color values.

Here, the computer 10 in combination with the printer 40 can be considered as a print control device. Also, the computer 10 equipped with the color measuring device 50 can be considered as a color information acquisition apparatus of this invention. Moreover, FIG. 1 can be considered as a color correction apparatus to correct a color difference, as a whole.

(2) From Printing of a Color Chart Through Calibration

Figure 2:
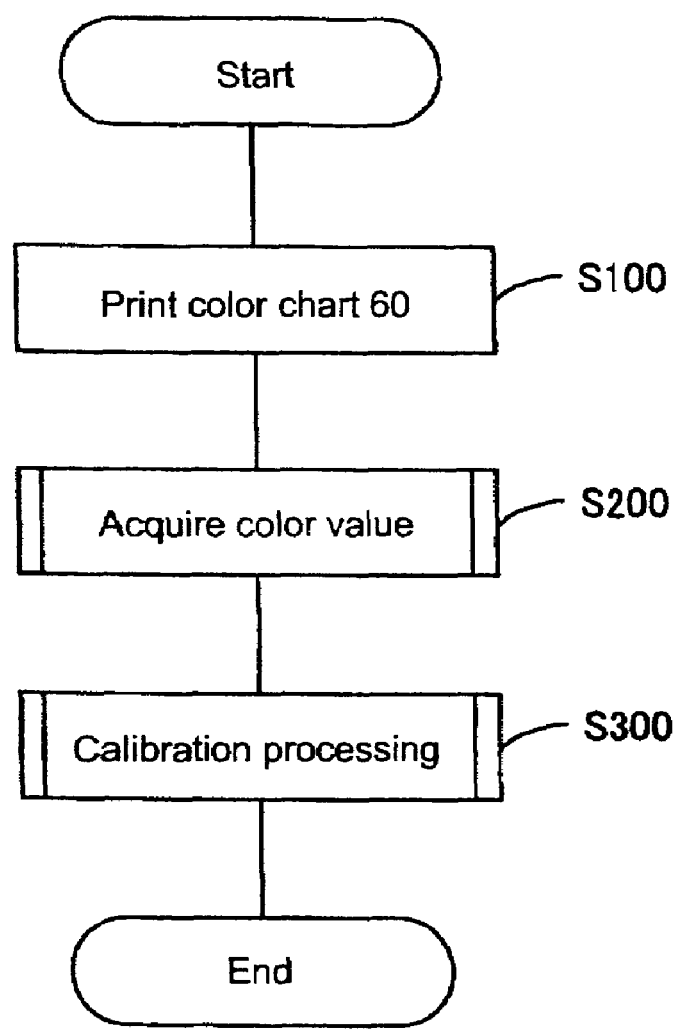
FIG. 2 is a simplified flowchart showing the processing by an embodiment of this invention.

FIG. 2 is a rough flowchart showing the steps of printing of a color chart through calibration.

In this figure, the first step is the printing of a predetermined color chart 60 (step S100). Specifically, when the user issues a command to print the color chart 60 via the UI, the PRTDRV 21 acquires the color chart image data 16 from the HDD 15. The acquired image data is then processed by each module of the PRTDRV 21 to output the color chart 60 based on the color chart image data 16 to the printer 40.

Figure 3:
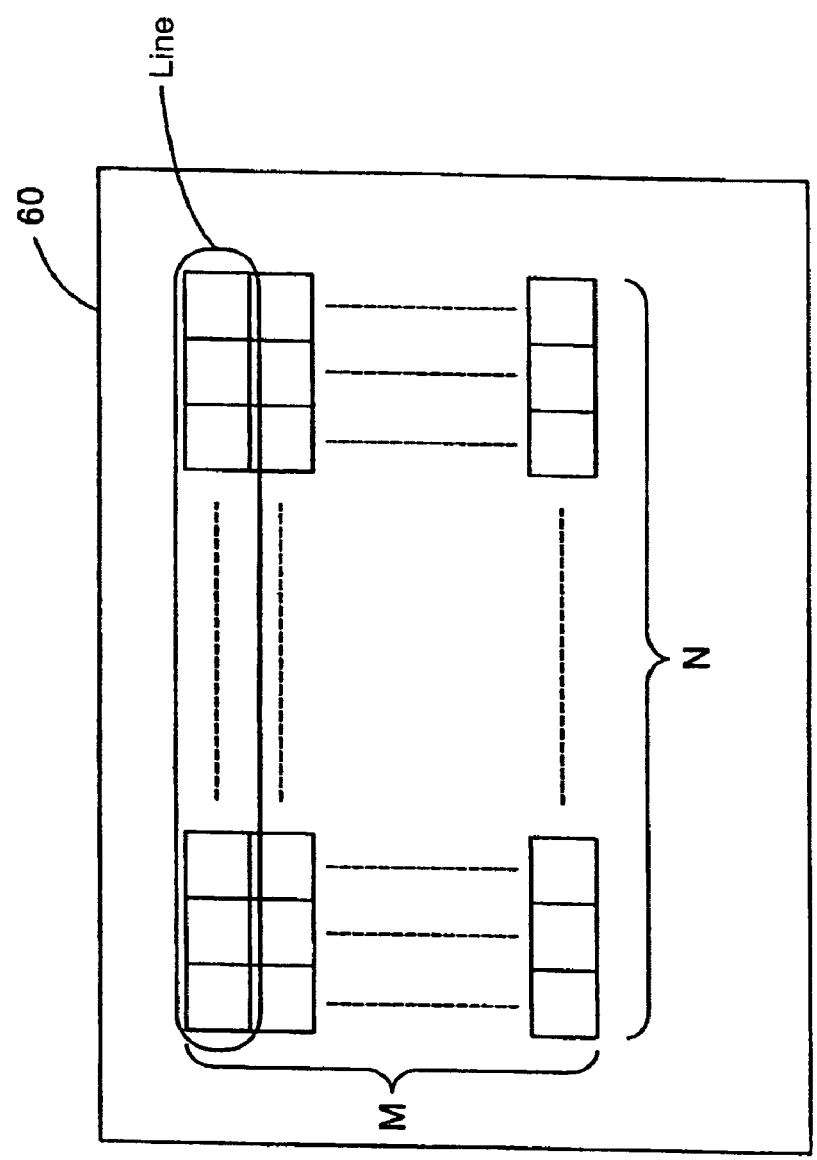
FIG. 3 shows a schematic diagram for a color chart.

FIG. 3 shows the printed color chart 60.

The color chart 60 consists of M×N patches. The color chart 60 is a collection of monochromatic patches which are printed by varying the ink recording rate per unit area (hereinafter, ink recording rate) for every CMYK ink color, in the predetermined gradation value range, and in which patches of different colors are randomly arranged. However, the arrangement of patches may be such that patches of each color of CMYK are arranged in gradation with changes in the graduation value.

Next, the PRTDRV 21 acquires the color value L*a*b of each of the patches composing the color chart 60 from the color measuring device 50 via the USB I/O port 19*b* (step S200) That is, the user measures each patch of the color chart 60 in predetermined order with the color measuring device 50, and obtains the color values resulting from the measurement. This color value acquisition processing is mainly performed by a color value acquisition section 21*e*1 of the calibration module 21*e*.

As shown in FIG. 3, the user measures one horizontal line of N patches (a patch group composing the measurement unit) of the color chart 60 in one measurement operation. Such a measurement is implemented, for example, by reading in the measurement values by sliding the noncontact color measuring device 50 from the leftmost patch to the rightmost patch. As a result, the color value acquisition section 21*e*1 also acquires the color values sequentially for every line. However, the measurement of the color chart 60 may not be done by measuring one line of patches in one operation. For example, a half line of patches may also be made to be the patch group composing the measurement unit mentioned above. If the measurement unit is other than one line, the characteristic value is to be determined for each patch group composing the measurement unit. The following description assumes that the measurement unit is one line, which is a typical measurement unit.

The calibration module 21*e* performs the calibration to correct the color conversion LUT 17 based on the result of having compared the color value of each patch obtained by the color value acquisition section 21*e*1 with a predetermined reference value 19 (step S300). This color value acquisition and calibration processing will be described below in detail.

As described above, the user measures the color chart 60 by the line. Meanwhile, the color value acquisition section 21*e*1 records and saves the color values input from the color measuring device 50 sequentially according to the predetermined gradation values. Therefore, the color value acquisition section 21e1 expects that the color values of patches are input in the predetermined order. In this embodiment, the color value acquisition section 21e1 basically saves the color values of the patches input at the first measurement according to the gradation values for the patches composing the first line of the color chart 60, saves the color value input at the second measurement according to the gradation values for the patches composing the second line, and so on. Accordingly, a measurement of the color chart is also started with the first line, then the second line, and so on. This measurement order is the "measurement order for lines" mentioned in the Claims below. However, said measurement order is not limited to the above example.

Even if the measurement order for each line is predetermined as described above, the user is not always able to measure the color chart accurately, and may sometimes measure in the wrong order. In this invention, therefore, the color value acquisition section 21e1 performs the following processing, whereby useless color measurements can be eliminated and efficient acquisition of color values can be achieved.

Figure 4:
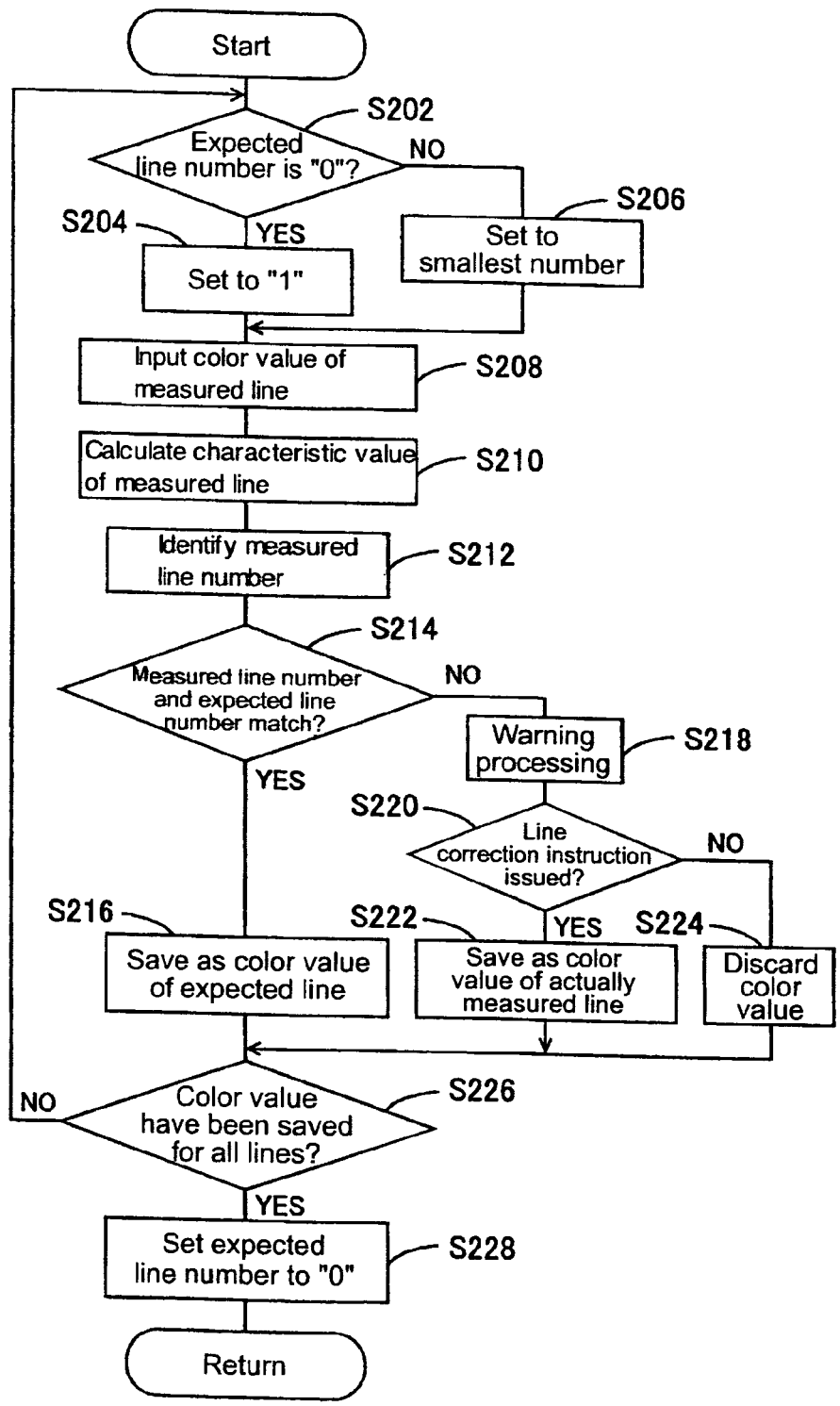
FIG. 4 is a flowchart showing a color value acquisition process.

FIG. 4 is a flowchart showing the processing to be performed by the color value acquisition section 21e1.

First, the color value acquisition section 21e1 checks if expected line number is "0" (step S202). The expected line number is the number of the line (expected line) from which the color value acquisition section 21e1 is to obtain color values at that point. The first line of the color chart 60 is given line number "1", the second line "2", and so on. When no line of the color chart 60 is not measured, the expected line number is set to "0". In that case, the expected line number is set to "1" (step S204). Meanwhile, as described below, when some lines have already been measured and the expected line number is set to other than "0" (NO in step S202), the color value acquisition section 21e1 sets the expected line number to the smallest number of the line numbers not yet measured at that point (step S206).

The calibration module 21e displays the currently set expected line number on the display 33 via the display driver DRV 23, during the color value acquisition processing. Consequently, the user is able to recognize the line to be measured by viewing the display. After the above processing, the color value acquisition section 21e1 inputs the color values of the patches in the line measured by the user (hereinafter, measured line) (step S208), and also calculates the characteristic value of the measured line (step S210). In this embodiment, the position of a particular patch (particular information patch) in the measured line is determined, and characteristic values (data indicating the characteristics of a patch group to be measured in one operation) is determined as numerical values to be uniquely derived based on the obtained information including the patch position above.

For the particular information patch, a blank patch with 0% ink recording rate, i.e. the highest brightness L*, or a patch (K patch) with 100% ink recording rate of K ink, i.e. the lowest brightness can be employed. Other patches can also be employed, such as a patch with highest or lowest color saturation (C* in the L*C*h color system), or one with highest or lowest density of any of CMYK colors. Here, the particular information patches should be suffixed with a number p(p is a number from 1 to the total number of types of particular information patches to be employed), such as particular information patch 1 for a blank patch, 2 for a K patch, 3 for a patch with highest color saturation.

Also, the position of a particular information patch p acquired from the measured line is assumed to be np: the leftmost patch position is 0, the patch positions to its right are 1, 2, , N−1. Under this assumption, in this embodiment, a numeral value to be obtained from the each information, $$np \times N^{p-1} \qquad \qquad 1)$$

is determined for each particular information patch in a given measured line, and also the sum of the numeral values is assumed to be the characteristic value for that measured value. N denotes the number of patches across the color chart 60.

To further describe the above, a concrete example is given here. In this example, particular information patch 1 (blank patch) and particular information patch 2 (K patch) are employed as the particular information patch. Also, it is assumed that, from the color chart image data 16, the blank patch is placed at 1×1 (row×column), 5×2, 7×3, and 15×4 patch positions, the K patch is placed at 12×2 patch position, and the color chart 60 with M=4 and N=16 is output.

First, step S210 identifies the positions n1 and n2 of the particular information patch 1 and the particular information patch 2 respectively in the measured line, based on the color values of individual patches in the measured line. Out of the color values of the patches, the position of a patch with highest brightness is designated as n1 and that of a patch whose brightness is 0 or near 0 and not over the predetermined value is designated as n2. If it is determined that the particular information patch 2 is not contained in the measured line, then n2=0.

When the n1 and the n2 are identified, numeral values are calculated with the above expression 1), and the calculated values are summated.

In the above concrete example, if the measured line is line number 1, then n1=0 and n2=0 and therefore the calculated characteristic value will be n1+n2×N=0.

If the measured line is line number 2, then n1=4 and n2=11 and therefore the calculated characteristic value will be n1+n2×N=180.

If the measured line is line number 3, then n1=6 and n2=0 and therefore the calculated characteristic value will be n1+n2×N=6.

If the measured line is line number 4, then n1=14 and n2=0 and therefore the calculated characteristic value will be n1+n2×N=14.

FIG. 5 shows the color values of the patches in an measured line, which have been input by the color measuring device 50.

In this figure, the leftmost column shows patch positions and the other columns show "L*", "a*", "b*", "D_C (density of C)", "D_M", "D_Y", and "D_K" respectively as examples of the color values measured at each patch position. That is, this table shows that when the user measured a given line, the color values as shown here were input to the color value acquisition section 21e1. For simplicity, the measured line consists of monochromatic patches M in this figure. If the color chart 60 to be printed is composed of patches of different colors arranged at random, those patches in which the density of C, Y, or K is detected are mixed.

As can be seen in this figure, in the measured line, the patch position n1 having highest brightness is 6, and n2 is 0 because there is no K patch. As a result, the characteristic value of the measured line to be calculated in step S210 will be n1+n2×N=6.

Then, in step S212, the line number of the measured line (measured line number) is identified, by referring to a database (DB) 18a in which the characteristic value calculated above and the line numbers of the color chart 60 and their respective characteristic values are recorded by making them correspond to each other.

In other words, since the color chart 60 to be printed is determined by the color chart image data 16, the characteristic value of each line is calculated beforehand and the correspondence between each line number and each characteristic value is saved as the DB 18a. In the above concrete example, the DB 18a contains the combinations of data, "line number 1 and characteristic value 0", "line number 2 and characteristic value 180", "line number 3 and characteristic value 6", and "line number 4 and characteristic value 14" are saved. Therefore, the measured line number is identified as "3", in this example.

Depending on the configuration of the color chart image data 16, the blank patch may not exist in any line. Even in such a case, it is possible to identify the line number of any measured line, by storing the characteristic value calculated with the position of a patch having highest brightness in each line as n1 and, when determining the characteristic value of the measured line, specifying the position of a patch with highest brightness as n1.

As described above, if the characteristic value is calculated with a patch having highest brightness as n1, out of the patches composing the measured line, when a blank patch is placed in one of the same patch positions in different two lines and a non-blank patch with highest brightness in its line is placed in the other, the same characteristic value might be calculated for both of the lines. However, this problem can be solved by increasing the type of the particular information patch to be employed. That is, if other particular information patches, such as the particular information patch 3 (a patch with highest color saturation) are also employed, it is possible to eliminate such a case where the characteristic values calculated based on the positions of particular information patches match, and thereby accurately identify the measured line number from the calculated character value.

After the characteristic values have been calculated and the measured line numbers identified, it is determined whether the measured line numbers match the expected line numbers set in step S204 or S206 above(step S214). If they match, the user has measured the line for which the color values are expected to be acquired by the color value acquisition section 21e1 at that point, and therefore the color value of each patch of the measured line and the graduation value of each patch of the expected line are recorded by making them correspond to each other, and are saved in a predetermined storage area (step S216).

If the measured line number and the expected line number does not match, the user has measured a line different from the line to be measured according to the color measurement order, and therefore the predetermined warning processing is performed (step S218). This warning processing displays both the measured line number and the expected line number on the display 33 via the display driver DRV 23 so that the user can recognize that a wrong line was measured. Also, such a display allows the user to discern accurately the measured line and the line to be measured next. The warning processing may also be implemented using an audio circuit and a speaker, neither of which are shown.

After the warning processing above, the color value acquisition section 21e1 checks if a predetermined line correction instruction was input (step S220). The line correction instruction is an instruction to be input via the UI, when the user desires, upon receipt of the above warning, to utilize the measurement result of the measured line instead of discarding it. If this line correction instruction is input, the color value of each patch is recorded by making it correspond to not the expected line but the gradation value of each patch of the measured line identified above, and is saved in the predetermined storage area.

After the each color value input above is saved in step S216 or S222, the color value acquisition section 21e1 determines whether the color values have been recorded and saved for all the lines of the color chart 60 (step S226). If it is determined that all the lines have not been processed, the color value acquisition section 21e1 sets the expected line number to the smallest number of the line numbers that have not been recorded nor saved at that point. That is, if the expected line number up to that time is m and the line number whose color value has been recorded and saved immediately before is also m, the expected line number is assumed to be m+1 (m+2 if the color value of the line number m+1 has already been saved, and soon). Whereas, if the line number whose color value has just been recorded and saved is other than m although the expected line number up to that point is m, or if a color value has not been recorded nor saved yet for any line, m is maintained as the expected line number.

If it is determined, in step S226, that color values have been recoded and saved for all lines, the expected line number is reset to "0" (step S228) and the acquisition of color values from the color chart 60 is finished. As a result, the calibration module 21e acquires the color values of all the patches of the printed color chart 60, with these color values corresponding to the graduation values of their respective patches. Thus, according to this invention, even if any line of the color chart 60 is measured in the wrong order, the user is able to not only recognize such an error but also save the color value of the erroneously measured line as the color value of that line. Therefore, even if the measurement is made in the wrong order it is not necessary to measure the same line again, and the color values of all the patches can be accurately acquired by performing the measuring operation the same number of times as the number of lines composing the color chart 60.

If the judgment is NO in step S220, the color value acquisition section 21e1 discards the color value of the measured line (step S224) and repeats the steps from step S202. In this case, in the processing for setting the expected line in step S206, the number that has been set up to that time will be maintained. This means that if the user recognizes that a wrong line was measured, the user will be able to choose to measure lines in the correct order.

Now, the calibration processing is described.

Here, the CMYK data obtained by the color conversion module 21b during the print processing is image data represented by a predetermined number of gradations (for example, 256) for each color of CMYK, and each graduation value corresponds to the amount of ink of each color. The amount of ink corresponding to graduation value is predetermined, such as ink recording rates 0 to 100% linearly correspond to graduation values 0 to 255. In the printer 40, however, as a print operation is repeated the mechanisms for printing undergo various changes over time, which are different by machine. Consequently, even if the amount of ink corresponding to each gradation value of CMYK is specified, the color property of each printer 40 will deviate from that of the reference printer of the same type (reference machine) over time, and the amount of ink corresponding to each gradation may not be precisely output.

Therefore, in the calibration processing of this embodiment, the color conversion LUT 17 of the printer 40 is altered according to the color values obtained from the color measurement results output from the printer 40 to be calibrated. Specifically, the color conversion LUT 17 is altered so that when the same image data is input and printed on the printer 40 and the reference machine, the colors output from the printer 40 and the reference machine will be roughly the same.

Figure 6:
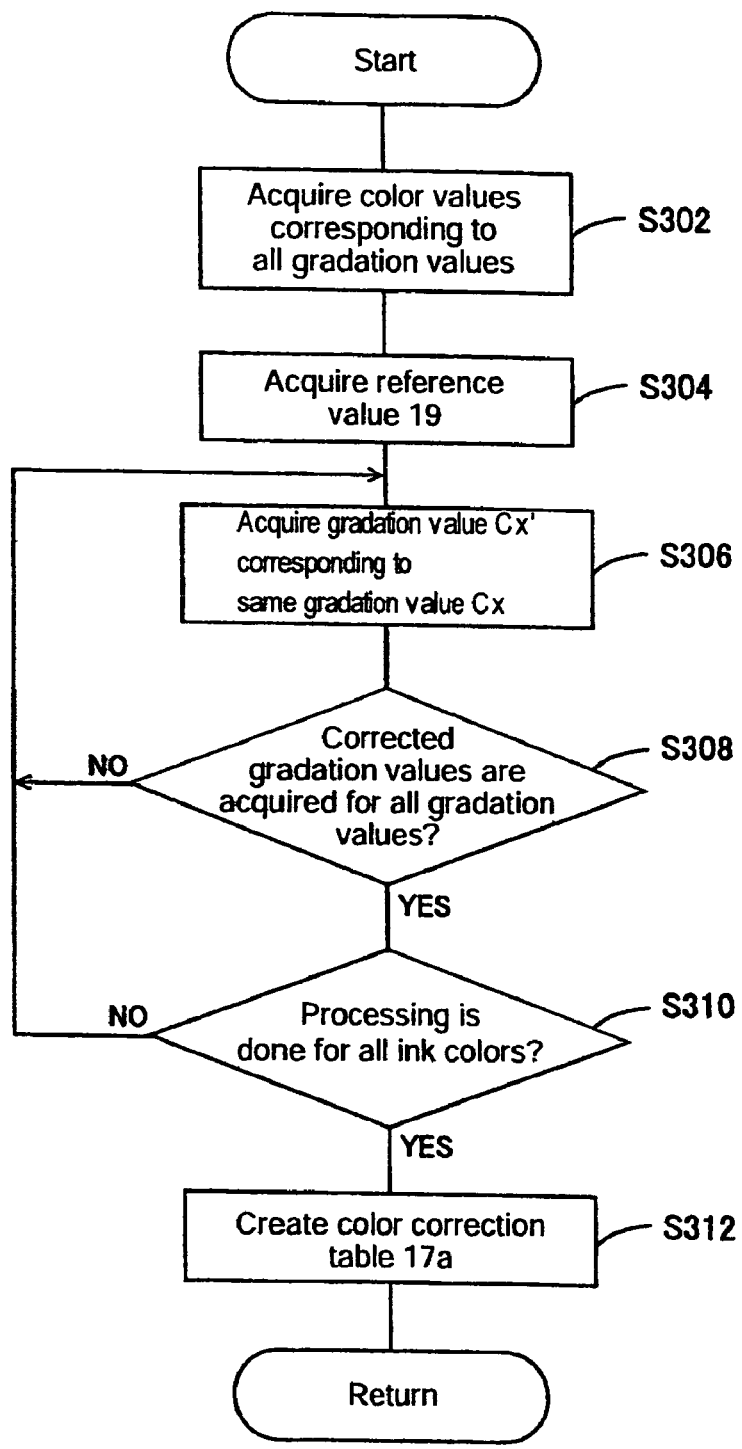
FIG. 6 is a flowchart showing a calibration process.

FIG. 6 is a flowchart showing the calibration processing.

In step S302, the calibration module 21e performs predetermined interpolation operations by referring to the color values obtained from the color chart 60, and thereby acquires the color values corresponding to all the gradation values. That is, since the color value obtained from each patch are color values corresponding to disconnected gradation values for each color of CMYK, the color values not corresponding to these graduation values are acquired by interpolation. Various interpolation methods including the linear interpolation and the spline interpolation may be employed. Next, the calibration module 21e obtains the reference value 19 saved in the HDD 15 (step S304). The reference value 19 is the correspondence between each gradation value and color value which have been acquired by measuring the color patches for all the gradation values (256) of each color of CMYK, printed by the reference machine. The calibration module 21e acquires the gradation value Cx', which is a corrected value of the same gradation value Cx, as follows (step S306).

Figure 7:
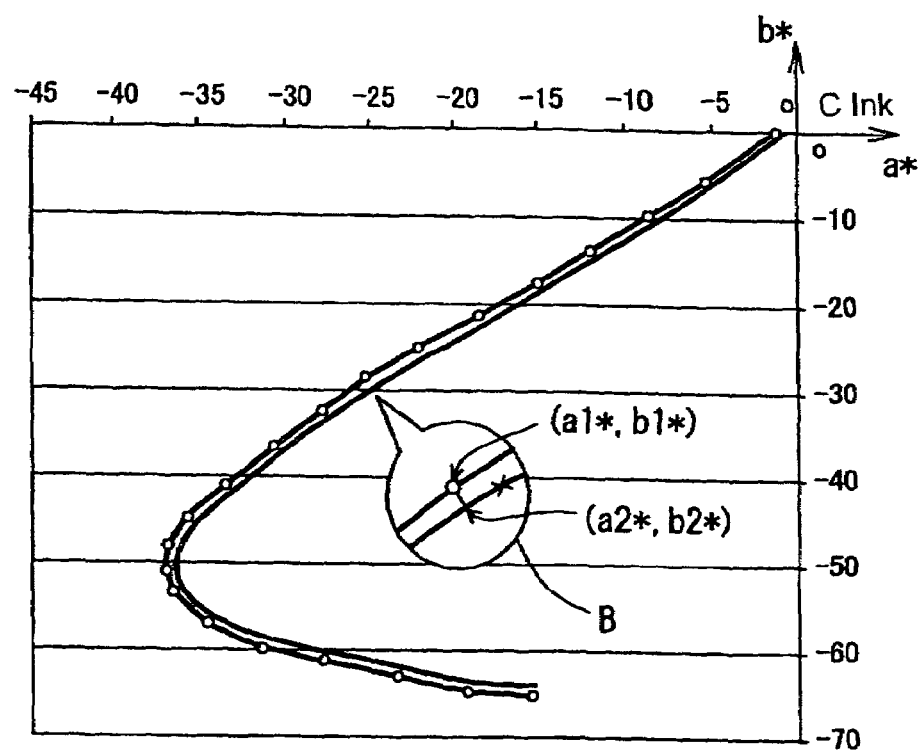
FIG. 7 is a projection chart for color values on an a*b* plane.

FIG. 7 shows the color value and the reference value 19 after the interpolation, on the same a*b* plane.

If there is no color difference between the printed result from the reference machine and the printer 40, the same color values should be obtained when the printed results (in this case, cyan) obtained by printing with the same gradation value Cx is measured. However, if there is a difference between the reference machine and the printer 40, the line connecting the color values after the interpolation and the line connecting the reference values (open circles) are misaligned on the a*b* plane, as shown in this figure. Note that all the reference values are not indicated by open circles here.

The enlarged view B of FIG. 7 shows the color values of the printed results obtained by printing with the same gradation value Cx on the reference machine and the printer 40, with an open circle and an x mark. With reference to the enlarged view B, step S306 can be described as follows: Out of the color values corresponding to all gradation values on the graph, a color value (a2*, b2*) having the minimum color difference Δ E from the reference value (a1*, b1*) corresponding to the gradation Cx is found, and thereby the gradation value Cx' corresponding to this color value is acquired. In other words, this processing calculates a color to be output with the gradation Cx on the reference machine and the gradation Cx' with which to output an equivalent color, as an approximate value, on the printer 40. If the correspondence between the calculated gradation value Cx' and the corrected gradation and that between the gradation Cx and the uncorrected graduation value are established, it is possible to create the color correction table 17a capable of correcting precisely the color differences that have been occurring up to that point under the printing conditions described above.

Step S308 determines whether or not a gradation value corresponding to the color value with a minimum color difference ΔE on the above graph has been acquired, for the reference values for all the graduation values. If it is determined that the processing is not finished for all the gradation values, then step S306 is repeated until the gradation values corresponding to the reference values for all the gradation values are acquired. If it is determined that step S306 was performed for the reference values for all the gradation values, then it is checked, in step S310, if the steps 306 and after are finished for all the ink colors to be used on the printer 40.

If it is determined that the steps S306 and after are not finished for all the ink colors, then the steps S306 and after are repeated. If it is determined that the steps S306 and after are finished for all the ink colors, the calibration module 21e creates the color correction table 17a showing the correspondence between the uncorrected gradation value and the corrected gradation values calculated above, for each ink color (step S312).

Thereafter, whenever the printer performs a printing operation, the conversion results from the color conversion LUT 17 to be altered are corrected. Specifically, when the gradation values converted by the color conversion LUT 17 is input as CMYK, which are then converted into C'M'Y'K' by referring to the color correction table 17a, and input to the half-tone processing module, the colors equivalent to those to be output from the reference machine can be obtained, and thereby the color difference on the printer 40 is corrected. Besides this method of further converting, by referring to the color conversion table 17a, the conversion results from the color conversion LUT 17, it is also possible to create an LUT in which the input values (RGB data) to the color conversion LUT 17 correspond to the output values from the color correction table 17a, and update the color conversion LUT 17 by referring to this created LUT.

Although the above description of the color value acquisition processing of this invention is premised on performing the calibration processing, this invention is also applicable to the profiling processing to acquire the device profile data indicating the color reproducibility of the printer 40.

(3) Other Embodiments

The method of identifying measured line numbers is not limited to the embodiment described above.

Figure 8:
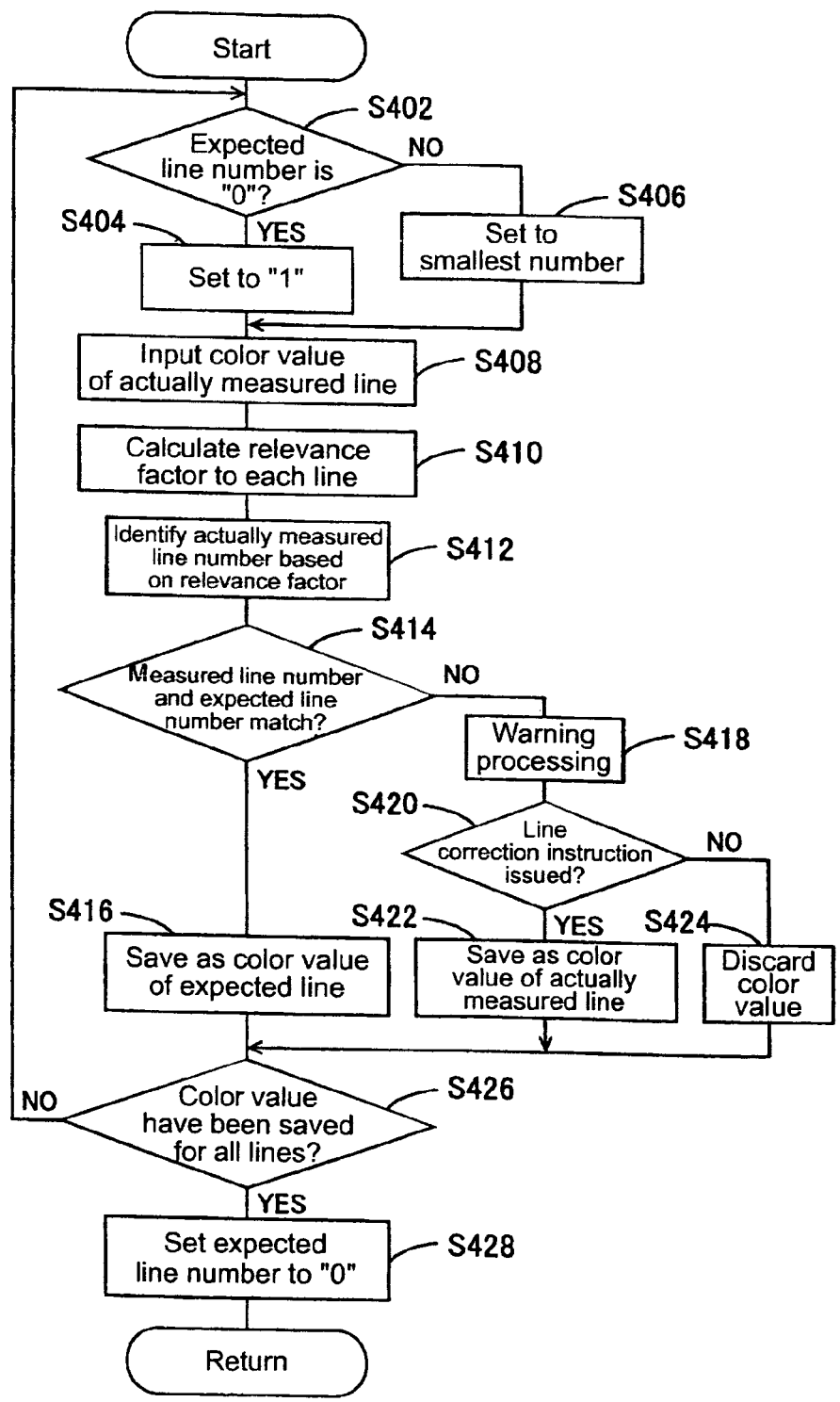
FIG. 8 is a flowchart showing a color value acquisition process in another embodiment of this invention.

FIG. 8 is a flowchart showing the processing by the color value acquisition section 21e1 in another embodiment, which is different from FIG. 4. The following description will focus on the differences from FIG. 4.

In FIG. 8, the color value acquisition section 21e1, after inputting the color value of each patch of the measured line (step S408), determines the relevance factors to this measured line and each line composing the color chart 60 respectively, and thereby identifies the line number with the highest relevance factor as measured line number (step S412).

The relevance factor is composed of two elements; average color difference and characteristic value.

First, the average color difference is described. In the case where the calibration described above is performed after the color values of the color chart 60 are acquired, the reference value 19 are saved in the HDD 15 beforehand. In this embodiment, the average color difference is obtained using the reference value 19. The reference value 19 defines the correspondence between all the gradation values and color values for each CMYK color, and therefore has color values corresponding to the graduation values of the patches of each line composing the color chart 60. Accordingly, the color value acquisition section 21e1 compares the color value of each patch of the measured line and the reference value (color value) of each patch of the line number m to calculate the color difference ΔE between the patches at the same position in the respective lines, and thereby to find the average value (average color difference) ΔEav_m. The average color difference ΔEav is found relative to the measured lines and all the lines of the color chart 60 respectively.

The color value acquisition section 21e1 may be made to find the average value (square mean value $\Delta E^2 av$) of the square of the color difference ΔE between patches, instead of the average color difference. When using the square mean value as the element of relevance factor, the "average color difference" and "Eav" below should be replaced with "square mean value" and "ΔE²av" respectively.

Basically, the line for which the minimum average value ΔEav_min is calculated can be considered as the measured line. However, if the relevance factor is determined only from the average color difference, the measured line may not be identified. Especially, in the case where the printer 40 is calibrated, it is highly likely that some difference occurs between the color value of the color chart 60 and the reference value 19, and therefore an accurate relevant factor may not be determined only from the average color difference ΔEav. In this embodiment, therefore, the elements of the relevant factor include the predetermined characteristic value as well as the average color difference ΔEav.

Now, the predetermined characteristic value will be described. This characteristic value (hereinafter, second characteristic value) is different from the characteristic value described in (2) above, but there is a commonality that both are calculated based on the position of each particular information patch.

FIG. 9 is schematic diagram showing the processing for determining the second characteristic value.

This figure shows a case where the predetermined information obtained from the color value of the measured line is compared with the predetermined information of the line number m out of the predetermined information for each line of the color chart 60 that has been saved in the DB 18b. Since the color chart 60 to be printed from the color chart image data 16 is predetermined, the predetermined information for each line is acquired beforehand and saved in the DB 18b with the corresponding line number, also in this embodiment.

The leftmost column of this table shows the particular information patch to be employed to determine the second characteristic value. In this embodiment, j types (1 to j) of particular information patches are employed. The left-of-middle column shows the positions n1 to nj of the particular information patches 1 to j of the measured line. That is, the color value acquisition section 21e1 identifies the positions of the particular information patches 1 to j of the measured line, based on the input color values of the measured line. These patch positions n1 to nj correspond to the "predetermined information" described above. The right-of-middle column shows the patch positions n1_m to nj_m of the particular information patches 1 to j of the line number m. These patch positions n1_m to nj_m are the "predetermined information" on the line number m which has been obtained from the DB 18b.

When the patch positions n1 to nj and the patch positions n1_m to nj_m are obtained, it is checked if the position of each particular information patch is the same between the measured lien and the line number m. That is, it is checked if n1=n1_m, n2=n2_m, . . . , nj=nj_m holds, and 1/j is given, as the second characteristic value element q, to a particular information patch which holds. To one a particular information patch which does not hold, 0 is given as the second characteristic value element q. The sum Q of these second characteristic elements q becomes the second characteristic value Qm of the measured line for the line number m.

Also, the second characteristic value Q is determined by comparing the patch positions n1 to nj of every line saved in the DB 18b between the measured lines and all the lines of the color chart 60. The second characteristic value Q comes to the maximum value 1 if the position of each particular information patch is the same between the measured line and the compared line. If the positions of some particular information patches are different between them, or if a certain particular information patch is not included in the compared line originally, then the second characteristic value Q comes to 0 or over and less than 1.

If there is a substantial difference from the color intended by the color chart 60, the patch whose position to be identified as a predetermined particular information patch of the measured line may not be located, or another patch of the same line may be located as the predetermined particular information patch. Moreover, it is possible that "1" cannot be obtained as the second characteristic value Q in matching with all the lines. Even in this case, if the indicator that the line where the second characteristic value Q close to the maximum value 1 is likely to be considered as the measured line is used, an appropriate measured line can be identified even if there is a substantial difference in color from the color chart 60.

Based on the average color difference ΔEav_m and second characteristic value Qm obtained between the measured line and line number m as described above, the relevance factor Xm is calculated as follows:

$$\text{Relevance factor} Xm = Qm + a/\Delta Eav\_m$$

where, a is a constant to comply with different standards. Similarly, the relevance factor X is calculated relative to another line number.

Then, the line number where the maximum relevance factor Xmax, out of relevance factors X, was calculated is identified as the measured line number. Thus, by effectively using the reference value 19 prepared for the calibration processing and also using the relevance factor taking into consideration the degree of positional matching between particular information patches, it is possible to accurately determine which line of the color chart 60 is the measured line. Steps S414 and after are the same as steps S214 and after.

From the standpoint of reducing the amount of calculation, it is also possible to limit the element of the relevance factor X to the second characteristic value.

(4) Conclusion

As described above, when the color values of each line of the color chart 60 are acquired in the predetermined order, the measured line measured by the user is identified and it is determined whether the measured line matches the expected line to be measured at that point, and if both lines do not match the predetermined warning is issued, and if a line correction instruction is input from the user, the color value of each patch input during the color measurement is recorded and saved by making it correspond to the gradation value of each patch of the measured line. As a result, even if the user measured the lines in the wrong order the result of that measurement will not become useless, and the color values of all the patches of the color chart 60 can be accurately obtained by a minimum measurement operation.

I claim:

1. A color information acquisition apparatus that measures a color chart consisting of a plurality of patches and acquires the color values of the patches, said color information acquisition apparatus comprising:

an input section that inputs color values of patches composing one line in the color chart by measuring one line in the color chart;

a measured line identification processor that identifies which line of lines composing the color chart is a measured line based on the color values input by the input section, and determines whether an identified line matches an expected line that is expected to be measured in order of measurement predetermined for each line of the color chart;

a warning section that performs a predetermined warning processing if the identified line and the expected line do not match; and a color value saving section that, when a line correction instruction that instructs to correct the expected line is input, saves the color value of each patch input by the input section by making the color value of each patch that the input section input correspond to gradation value of each patch composing the identified line.

2. A color information acquisition apparatus of claim 1, wherein:

said measured line identification processor, based on a predetermined characteristic value of said measured line that has been acquired based on a predetermined color value that the input section input, identifies which line of lines composing said color chart is said measured line.

3. A color information acquisition apparatus of claim 2, wherein:

said measured line identification processor acquires a position of a particular patch contained in said measured line based on said color value input by the input section, and acquires said characteristic value determined based on said position, and also identifies said measured line by referring to a correspondence between each line of said color chart and its characteristic value stored in a predetermined storage area.

4. A color information acquisition apparatus of claim 2, wherein:

said measured line identification processor determines a relevance factor of said measured line and each line, which is composed of a result of comparing between lines of the characteristic value, the color value of each patch of said measured line, and a reference color value of each patch of said color chart stored in the predetermined storage area, and identifies the line with highest relevance factor as the measured line, based on said relevance factor.

5. A color information acquisition apparatus of claim 3, wherein said measured line identification processor acquires said characteristic value by identifying both or either one of a patch with highest brightness and a patch with lowest brightness.

6. A color information acquisition apparatus of claim 1, wherein said warning section causes a predetermined display device to display said identified line and said expected line.

7. A color information acquisition method to acquire the color value of each patch by measuring a color chart composed of a plurality of patches, said method comprising:

inputting color values of patches composing one line in the color chart by measuring one line in the color chart;

identifying which line of lines composing the color chart is a measured line based on the input color values and determining whether an identified line that is identified matches an expected line that is expected to be measured in order of measurement predetermined for each line of the color chart;

performing a predetermined warning processing if the identified line and the expected line do not match; and saving the color value of each input patch by making the color value of each input patch correspond to a gradation value of each patch composing the identified line, when a line correction instruction that instructs to correct the expected line is input;

wherein the method is performed by a processor.

8. A computer-readable medium storing a control program to have a computer carry out a color information acquisition method to measure a color chart consisting of a plurality of patches and acquire the color value of each patch, said method comprising:

inputting color values of patches composing one line in the color chart by measuring one line in the color chart;

identifying which line of lines composing the color chart is a measured line based on the input color values and determining whether an identified line that is identified matches an expected line that is expected to be measured in order of measurement predetermined for each line of the color chart;

performing a predetermined warning processing if the identified line and the expected line do not match; and saving the color value of each in put patch by making the color value of each input patch correspond to a gradation value of each patch composing the identified line, when a line correction instruction that instructs to correct the expected line is input.

9. A color information acquisition apparatus comprising:

a device that stores correspondence between a patch group consisting of a plurality of patches to be measured by one measurement operation and a characteristic value indicating characteristics of the patch group as to a plurality of patch groups;

a device that calculates the characteristic value of a measured patch group based on a type of a particular information patch contained in the measured patch group and position of the particular information patch in the measured patch group, wherein the characteristic value that is calculated is a unique value for the measured patch group; and a unit that identifies which patch group of the patch groups that said correspondence is stored is the measured patch group by referring to the characteristic value that is calculated and said correspondence thereto.

10. A color information acquisition method comprising:

storing correspondence between a patch group consisting of a plurality of patches to be measured by one measurement operation and a characteristic value indicating characteristics of the patch group as to a plurality of patch groups;

calculating the characteristic value of a measured patch group based on a type of a particular information patch contained in the measured patch group, and position of the particular information patch in the measured patch group, wherein the characteristic value that is calculated is a unique value for the measured patch group; and identifying which patch group of the patch groups that said correspondence is stored is the measured patch group by referring to the characteristic value that is calculated and said correspondence thereto;

wherein the method is performed by a processor.

11. A computer-readable medium storing a control program to have a computer carry out a color information acquisition method, said method comprising:

storing correspondence between a patch group consisting of a plurality of patches to be measured by one measurement operation and a characteristic value indicating characteristics of the patch group as to a plurality of patch groups;

calculating the characteristic value of a measured patch group based on a type of a particular information patch contained in the measured patch group and position of the particular information patch in the measured patch group, wherein the characteristic value that is calculated is a unique value for the measured patch group; and identifying which patch group of the patch groups that said correspondence is stored is the measured patch group by referring to the characteristic value that is calculated and said correspondence thereto.

* * * * *